United States Patent
Van Spijk

(10) Patent No.: US 6,280,357 B1
(45) Date of Patent: Aug. 28, 2001

(54) CONTINUOUSLY VARIABLE TRANSMISSION

(75) Inventor: Johannes Gerardus Ludovicus Maria Van Spijk, Drunen (NL)

(73) Assignee: Van Doorne's Transmissie B.V., Tilburg (NL)

( * ) Notice: Subject to any disclaimer, the term of this patent is extended or adjusted under 35 U.S.C. 154(b) by 0 days.

(21) Appl. No.: 09/290,877

(22) Filed: Apr. 14, 1999

(30) Foreign Application Priority Data

Apr. 14, 1998 (EP) .................................................. 98201211

(51) Int. Cl.⁷ .................................................. F16H 61/00
(52) U.S. Cl. .................................................. 474/16; 474/28
(58) Field of Search .................................. 474/18, 28, 30, 474/16, 208, 210, 45, 91, 93, 8; 477/45, 48, 46

(56) References Cited

U.S. PATENT DOCUMENTS

| 4,753,627 | * | 6/1988 | Kawamoto | 474/28 X |
| 5,145,464 | * | 9/1992 | Mori | 474/28 X |
| 5,676,612 | * | 10/1997 | Schellekens et al. | 474/28 X |
| 5,711,730 | * | 1/1998 | Friedman et al. | 474/28 X |
| 5,800,299 | * | 9/1998 | Lamers et al. | 474/45 |
| 6,015,359 | * | 1/2000 | Kunii | 474/28 X |

FOREIGN PATENT DOCUMENTS

| 0 062 877 A1 | 10/1982 | (EP) . |
| 0 777 069 A1 | 6/1997 | (EP) . |
| 2 192 671 | 2/1974 | (FR) . |
| 2 371 615 | 6/1978 | (FR) . |
| 2260582 | * 11/1989 | (GB) . |
| 283458 | * 11/1989 | (JP) . |

* cited by examiner

*Primary Examiner*—David A. Bucci
*Assistant Examiner*—Marcus Charles
(74) *Attorney, Agent, or Firm*—Yougn & Thompson

(57) ABSTRACT

A continuously variable transmission is provided with an adjustable pulley assembly including two sheaves on a pulley shaft, at least one sheave is axially movable with respect to the pulley shaft by a hydraulically operated movement, the movement includes a piston/cylinder assembly for generating a first force acting on the movable sheave and centrifugal pressure compensator for generating a second force acting on the movable sheave in a direction opposite with respect to the first force; the centrifugal pressure compensator includes a further cylinder fixed to the axially movable sheave in radial direction beyond the piston/cylinder assembly, and a further piston fixed to the pulley shaft, the further piston and the further cylinder form a further piston/cylinder assembly.

15 Claims, 2 Drawing Sheets

CONTINUOUSLY VARIABLE TRANSMISSION

BACKGROUND OF THE INVENTION

The invention relates to a continuously variable transmission or CVT, in particular for motor vehicles, provided with an adjustable pulley assembly comprising two conical sheaves on a pulley shaft and at least one sheave being axially movable with respect to the pulley shaft by means of hydraulically operated movement means. The movement means comprise a piston/cylinder assembly for generating a first force acting on the movable sheave in the direction of the other sheave and centrifugal pressure compensating means for generating a second force acting on the movable sheave in a direction opposite with respect to said first force.

DESCRIPTION OF THE RELATED ART

Such a CVT is known from the European patent publication EP-A-0.777.069 and comprises a driving primary pulley assembly and a driven secondary pulley assembly, each provided with an axially movable and an fixed sheave. A tapered drive belt is trained around said pulley assemblies. The ratio of the radial positions of the drive belt between the sheaves of the primary and of the secondary pulley assembly determines the speed ratio between a primary shaft drivingly connected to the primary pulley assembly and a secondary shaft drivingly connected to the secondary pulley assembly. The piston/cylinder assemblies define hydraulic chambers, the so called pressure chambers, that are used to set said radial positions of as well as the tension in the driving belt. By increasing or decreasing the fluid pressure in a pressure chamber, said first force acting on the movable sheave in the direction of the fixed sheave of pulley assembly may be increased or decreased respectively. Said movable sheave may thus e.g. be urged towards the other sheave of a primary pulley assembly, so that the circular section of contact between the tapered drive belt and the conical sheaves of said primary pulley assembly is urged radially outward, whereas the section of contact between the drive belt and the conical sheaves of the secondary pulley assembly is urged radially inward. Depending on whether fluid is allowed to flow away from the pressure chamber of the secondary pulley assembly, the transmission ratio or the tension in the drive belt changes.

In order to accurately control a CVT, accurate control of the pressure levels inside the pressure chamber(s) of both pulley assemblies is essential. However, by the rotation of the pulley assemblies during operation of the CVT, the centrifugal force builds up a centrifugal pressure in the fluid in a pressure chamber, which centrifugal pressure is dependent of the rotational speed of a pulley assembly and of the radial dimension of the pressure chamber. Due to the centrifugal pressure the tension in the driving belt can become undesirably high or it can become impossible to exploit the full speed ratio coverage of the CVT at high rotational speeds. To compensate for force acting on the movable sheave due to the centrifugal pressure in the pressure chamber, the known construction is provided with centrifugal pressure compensating means as an integral part of the piston/cylinder assembly. In the known construction the cylinder of the piston/cylinder assembly extends in axial direction beyond the piston of the piston/cylinder assembly and is provided with an annular wall part extending radially inward, thereby defining a further hydraulic chamber, the so called compensation chamber. The centrifugal pressure compensating means exert a second force acting on the movable sheave in a direction opposite with respect to said first force. The magnitude of the second force is dependent of the fluid pressure in the compensation chamber, which in turn is dependent of the centrifugal force. It is thus achieved, that the cylinder pressure may be controlled essentially independently from the rotational speed of a pulley assembly.

The known CVT functions satisfactorily, but possesses as a drawback that the second force exerted by centrifugal pressure compensating means only partly compensates the centrifugal pressure in the pressure chamber, especially at relatively high rotational speeds of a pulley assembly. A seemingly available solution to this insufficiency would be the increase of the dimensions of the compensation chamber. However, increasing the radial dimension of the piston/cylinder assembly does increase said second force, but also increases the centrifugal component of said first force. In the known construction the cylinder of the movable sheave is extended axially to locate the compensation chamber in line with the pressure chamber. This requires additional axial space to accommodate the movements of the movable sheave.

SUMMARY OF THE INVENTION

It is the object of the present invention to provide for a compact CVT with hydraulically operated adjustable pulley assemblies comprising centrifugal pressure compensating means providing adequate compensation within a confined space. According to the invention the CVT is provided with an adjustable pulley assembly with centrifugal pressure compensating means comprising a further cylinder, fixed to the axially movable sheave in radial direction beyond the piston/cylinder assembly, and a further piston fixed to the pulley shaft. Said further piston and said further cylinder interact in a sealing manner, forming a further piston/cylinder assembly. A CVT according to the invention possesses small dimensions with respect to a state of the art transmission as well as a number of additional advantages, that are elucidated below.

The centrifugal pressure is dependent of the radius to the second power, as is the surface area on which said pressure acts, so that the second force acting on the axially movable sheave is dependent of the radius to the fourth power. Since the further piston/cylinder assembly according to the invention defines a further hydraulic chamber partly located in radial direction beyond the pressure chamber, the surface area required for generating a desired compensating force is significantly reduced with respect to the known construction, thereby decreasing the dimensions of the CVt. By providing said further cylinder with an appropriate shape, a smaller or larger further hydraulic chamber may be effected. A CVT according to the invention possesses the advantage, that full compensation of the centrifugal pressure (or even over-compensation) is easily achieved, by inward relatively independently from the dimensions of the pressure chamber selecting a suitable surface area for the annular wall part of the further cylinder extending radially. A large second force can be effected by increasing the radial and axial dimension of the pulley assembly. Additionally, according to the invention a cheap and technically simple supply tube may be adopted to supply fluid to said further hydraulic chamber, because the centrifugal pressure compensating means may be located radially spaced from the pulley shaft. To this end the supply tube is provided with a supply hole substantially over an opening in said further hydraulic chamber. In the known construction expensive and complicated supply means are adopted, such as a bore in the pulley shaft or a calibrated supply opening in a piston.

According to a development of the invention, said further piston is fixed either directly to the pulley shaft or by means of an intermediate element such as the piston of the piston/cylinder assembly.

In a further development of the invention, said centrifugal pressure compensating means comprise a baffle plate for guiding fluid. Said baffle plate is fixed to said further piston in such a manner that fluid is allowed to flow between the baffle plate and said further piston to said further hydraulic chamber. In this manner centrifugal pressure is already build up outside the further hydraulic chamber, increasing the centrifugal pressure level inside said chamber. A large second force can thus be effected within an axially confined space.

BRIEF DESCRIPTION OF THE DRAWINGS

The invention will now by way of example be discussed in greater detail with reference to the figures.

DESCRIPTION OF THE PREFERRED EMBODIMENT

Figure 1:
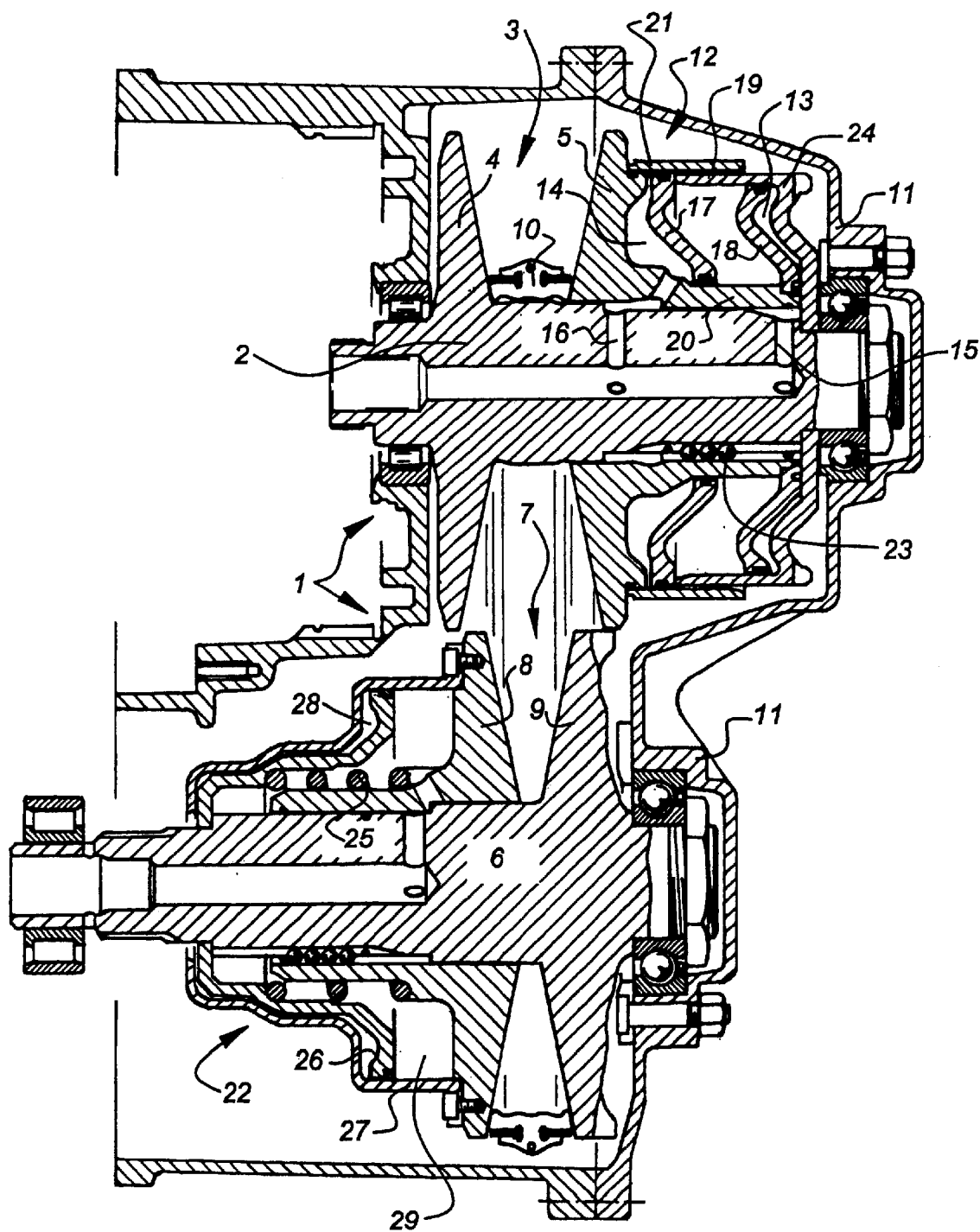
FIG. 1 shows a CVT according to the prior art.

The continuously variable transmission 1 according to the prior art shown in FIG. 1 is located inside a transmission housing 11 and is provided with a primary and a secondary pulley assembly 3 and 7 respectively. The pulley assemblies 3 and 7 comprise a fixed sheave 4 and 9 respectively, an axially movable sheave 5 and 8 respectively and a pulley shaft 2 and 6 respectively. A tapered drive belt 10 is trained around said pulley assemblies 3 and 7. The piston/cylinder assembly 12 of the primary pulley assembly 3 comprises two pistons 17 and 18 located in two cylinders 21 and 19, 24 defining two pressure chambers 14 and 13. Passages 15 and 16 link the chambers 14 and 13 with a hydraulic circuit. The axially movable sheave 5 is supported by the pulley shaft 2 via a collar 20 and ball bearings 23. The piston/cylinder assembly 22 of the secondary pulley assembly 7 comprises a single piston 26 located in a single cylinder 27, defining a single pressure chamber 29. Cylinder 27 extends in the axial direction beyond piston 26, thereby defining a compensation chamber 28. A spring 25 is provided in the pressure chamber 27 for exerting a minimum force acting on the axially movable sheave 8 in the direction of the fixed sheave 9.

Figure 2:
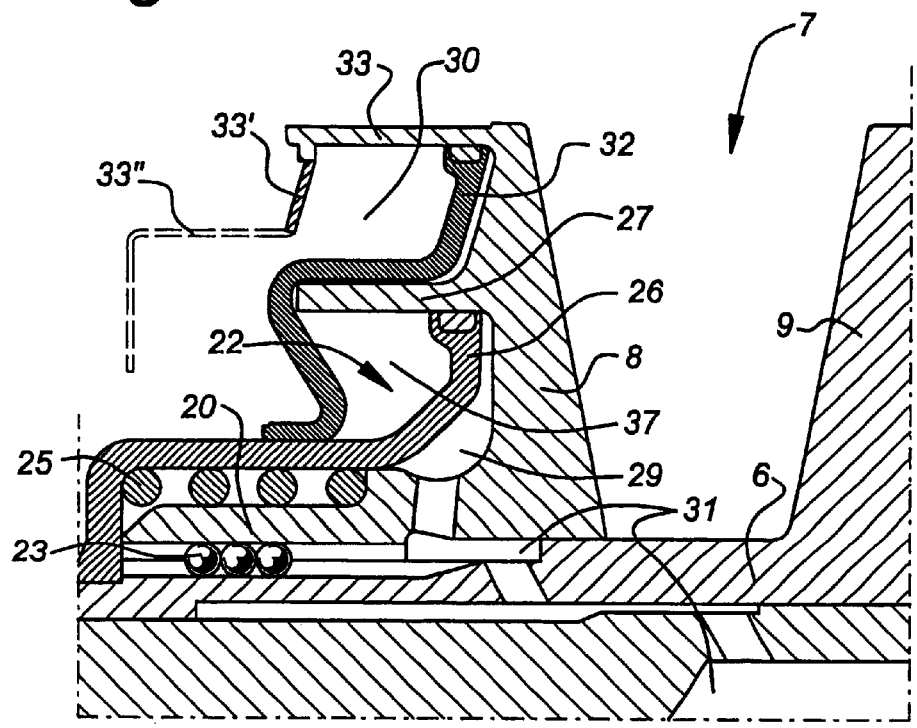
FIG. 2 shows a pulley assembly with centrifugal pressure compensating means according to the invention.

FIG. 2 shows a cross section of a secondary pulley assembly 7 with centrifugal pressure compensating means 32, 33 and 33' according to the invention. The pulley comprises a fixed sheave 9, an axially movable sheave 8 and a pulley shaft 6. The axially movable sheave 8 is fixed to a collar 20 provided on the pulley shaft 6 by means of ball bearings 23. The piston/cylinder assembly 22 comprises a piston 26 and a cylinder 27 defining a pressure chamber 29. Fluid may be supplied to and from said pressure chamber 29 via a passage 31, 31'. A spring 25 is provided for exerting a minimum force on the axially movable sheave 8. The centrifugal pressure compensating means 32, 33 and 33' comprise a further piston 32 fixed to the piston 26 and a further cylinder 33, 33' fixed to the axially movable sheave 8. Piston 32 is bend so that part thereof may extend around cylinder 27 and interact in a sealing manner with the further cylinder 33, 33'. The further piston 32 may be designed so, that it can only be positioned between further cylinder 33, 33' and piston 26 with some elastic deformation. Friction then effects fixation of the further piston 32 with respect to the piston 26. By means of friction attached to the further cylinder 33, 33' comprises an axially extending wall part 33 as well as a annular wall part 33' extending radially inward. Part of said annular wall part 33' is bend so that part thereof may extend around cylinder 27. Said further piston 32 and said further cylinder 33, 33' form a further piston/cylinder assembly, which defines a further hydraulic chamber 30.

Centrifugal pressure is build-up in the further hydraulic chamber 30. Said centrifugal pressure acts on the annular wall part 33', thereby generating a centrifugal pressure dependent force acting on the movable sheave 8 in a direction opposite with respect to the force generated by the pistor/cylinder assembly 22. By providing the further cylinder 33, 33' with an appropriate shape, such as depicted by the dotted lines 33", a large centrifugal pressure dependent force may be effected. Since, chambers 29 and 30 are pressurised during operation of the CVT, fluid may leak between a piston 28, 32 and a cylinder 27, 33, 33' into chamber 37. To prevent fluid from building up in chamber 37, the axially movable sheave 8 or cylinder 33, 33' is provided with a predominantly radially oriented fluid passage.

Figure 3:
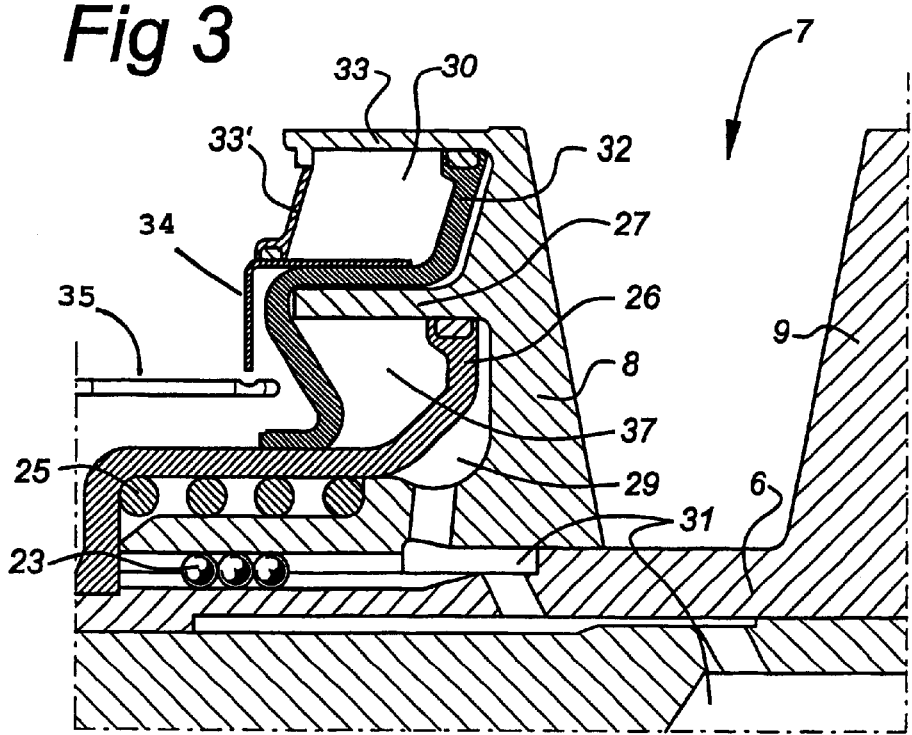
FIG. 3 shows a further development of a pulley assembly with centrifugal pressure compensating means according to the invention.

FIG. 3 shows a pulley assembly with centrifugal pressure compensating means 32, 33, 33' and 34 according to a further development of the invention. In FIG. 3 the further cylinder 33, 33' slideably and in a sealing manner engages a baffle plate 34, which is fixed to the further piston 32. One or more openings are provided between said baffle plate 34 and said further piston 32 to allow fluid to and from a further hydraulic chamber 30. In this manner centrifugal fluid pressure starts to build-up outside the further hydraulic chamber 30, between said baffle plate 34 and said further piston 32. The overall centrifugal pressure in the further hydraulic chamber 30 is thus increased, so that a large centrifugal pressure dependent force can be effected. FIG. 3 also shows a fluid supply tube 35 with a supply hole for allowing fluid from a hydraulic circuit to the further hydraulic chamber 30.

The invention further relates to all features of the accompanying drawings and claims.

What is claimed is:

1. A continuously variable transmission (1) comprising:
   an adjustable pulley assembly (7) comprising two sheaves (8, 9) on a pulley shaft (6),
   at least one sheave (8) being axially movable with respect to the pulley shaft (6) by a hydraulically operated movement means,
   said movement means comprising
   a piston/cylinder assembly (22; 26, 27, 29) provided with a piston (26) and a cylinder (27) fixed to the axially movable sheave (8) for generating a first force acting on the movable sheave (8), and
   a centrifugal pressure compensating means for generating a second force acting on the movable sheave (8) in a direction opposite with respect to said first force,
   said centrifugal pressure compensating means comprising
   a further cylinder (33, 33'), fixed to the axially movable sheave (8) in a radial direction outward of the piston/cylinder assembly (22; 26, 27, 29), and
   a further piston (32), fixed to the pulley shaft (6),
   said further piston (32) and said further cylinder (33, 33') forming a further piston/cylinder assembly.

2. A continuously variable transmission (1) according to claim 1, wherein, said further piston (32) is fixed to the pulley shaft (6) via an intermediate element (26).

3. A continuously variable transmission (1) according to claim 1, wherein said further piston (32) is provided with a bend, a part thereof extending around the piston/cylinder (22; 26, 27, 29) assembly for allowing relative movement.

4. A continuously variable transmission (1) according to claim 1, characterised in that, said further cylinder (33) is provided with an annular wall part (33') extending radially inward, for defining a hydraulic chamber (30).

5. A continuously variable transmission (1) according to claim 1, characterised in that, said centrifugal pressure compensating means comprise a baffle plate (34).

6. A continuously variable transmission (1) according to claim 1, characterised in that, a supply tube (35) is provided for allowing fluid to a hydraulic chamber (30).

7. A continuously variable transmission (1) according to claim 2, wherein said intermediate element (26) is the piston of the piston/cylinder assembly (26).

8. A continuously variable transmission (1) according to claim 4, wherein said annular wall part (33', 33") is provided with a bend, a part thereof extending around the piston/cylinder assembly (22; 26, 27, 29) for allowing relative movement.

9. A continuously variable transmission (1) according to claim 5, wherein said baffle plate (34) is fixed to said further piston (32).

10. A continuously variable transmission (1) comprising:

an adjustable pulley assembly (7) including a pulley shaft (6), and two sheaves (8, 9) located on the pulley shaft (6), one of the two sheave being a movable sheave (8); and a hydraulically-operated movement means arranged to axially move the movable sheave (8) with respect to the pulley shaft (6), the movement means including a piston (26) and a cylinder (27) forming a piston/cylinder assembly (26, 27) for generating a first force acting on the movable sheave (8), and a centrifugal pressure compensating means for generating a second force acting on the movable sheave (8) in a direction opposite with respect to the first force, the centrifugal pressure compensating means including a further cylinder (33) fixed to the movable sheave (8) in a radial direction beyond the piston and cylinder assembly (26, 27), and a further piston (32), fixed to the pulley shaft (6) via the piston (26), the further piston (32) and the further cylinder (33) forming a further piston/cylinder assembly.

11. A continuously variable transmission (1) according to claim 10, wherein said further piston (32) is provided with a bend, such that a part thereof extends around the piston/cylinder assembly for allowing relative movement.

12. A continuously variable transmission (1) according to claim 10, wherein the centrifugal pressure compensating means further comprise a baffle plate (34).

13. A continuously variable transmission (1) according to claim 10, wherein the further cylinder (33) is provided with an annular wall part (33') extending radially inward and defining a hydraulic chamber (30).

14. A continuously variable transmission (1) according to claim 13, wherein the annular wall part (33', 33") is provided with a bend, a part of the bend extending around the piston/cylinder assembly (22; 26, 27, 29) for allowing relative movement.

15. A continuously variable transmission (1) comprising:

an adjustable pulley assembly (7) having a pulley shaft (6), and two sheaves (8, 9) located on the pulley shaft (6), one of the two sheave being a movable sheave (8); and a hydraulically-operated movement means arranged to axially move the movable sheave (8) with respect to the pulley shaft (6), the movement means including a piston (26) and a cylinder (27) forming a piston/cylinder assembly (26, 27) for generating a first force acting on the movable sheave (8), and a centrifugal pressure compensating means for generating a second force acting on the movable sheave (8) in a direction opposite with respect to the first force, the centrifugal pressure compensating means including a further cylinder (33) fixed to the movable sheave (8) in a radial direction beyond the piston and cylinder assembly (26, 27), a further piston (32), fixed to the pulley shaft (6), the further piston (32) and the further cylinder (33) forming a further piston/cylinder assembly, and a baffle plate (34) fixed to the further piston (32).

* * * * *